US006935673B1

(12) United States Patent
Derleth et al.

(10) Patent No.: US 6,935,673 B1
(45) Date of Patent: Aug. 30, 2005

(54) DASHBOARD OF A PASSENGER MOTOR VEHICLE AND METHOD OF MAKING SAME

(75) Inventors: Martin Derleth, Schonungen (DE);
Guenter Ebner, Korntal-Muenchingen (DE); Sabine Neuss, Freiberg/Neckar (DE); Walter Wolf, Oppenweiler-Zell (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/714,456

(22) Filed: Nov. 17, 2000

(30) Foreign Application Priority Data

Nov. 17, 1999 (DE) .............................. 199 55 221

(51) Int. Cl.[7] ............................................ B62D 25/14
(52) U.S. Cl. ................................... 296/72; 296/96.21
(58) Field of Search .............................. 296/72, 146.1, 296/96.21

(56) References Cited

U.S. PATENT DOCUMENTS

| 2,494,980 A | 1/1950 | Zuckerman | ................... 311/21 |
| 2,818,933 A | 7/1958 | Tell | .............................. 180/90 |
| 4,105,223 A | 8/1978 | Oda et al. | .................... 280/752 |
| 4,559,868 A * | 12/1985 | Nonaka et al. | |
| 5,549,344 A | 8/1996 | Nishijima et al. | ............ 296/70 |
| 5,685,598 A * | 11/1997 | Inoue et al. | .................. 296/72 |
| 5,992,876 A * | 11/1999 | Gray | ....................... 280/728.3 |

FOREIGN PATENT DOCUMENTS

| DE | 1 891 785 | 4/1964 |
| DE | 33 10 886 | 9/1984 |
| DE | 34 07 670 | 9/1984 |
| DE | 34 30 121 | 2/1986 |
| DE | 196 11 192 | 9/1997 |
| DE | 196 20 921 | 11/1997 |
| DE | 198 07 309 | 8/1999 |
| JP | 7-309154 | 11/1995 |
| JP | 8-119000 | 5/1996 |
| JP | 8-132922 | 5/1996 |
| JP | 9-2104 | 1/1997 |
| JP | 9-249048 | 9/1997 |
| JP | 11-48829 | 2/1999 |

* cited by examiner

*Primary Examiner*—Jason Morrow
(74) *Attorney, Agent, or Firm*—Crowell & Moring LLP

(57) ABSTRACT

A dashboard of a motor vehicle passenger car, includes an upper part which covers installations. The installations and the upper part are provided with meshing fastening structure, which are positioned toward the top corner relative to the interior of the motor vehicle and can be fitted together in this direction. This arrangement accommodates assembly of the upper part after a vehicle windshield is installed.

6 Claims, 2 Drawing Sheets

DASHBOARD OF A PASSENGER MOTOR VEHICLE AND METHOD OF MAKING SAME

BACKGROUND AND SUMMARY OF THE INVENTION

This application claims the priority of German Patent Application No. 199 55 221.5, filed in Germany on Nov. 17, 1999, the disclosure of which is expressly incorporated by reference herein.

The present invention relates to a dashboard of a motor vehicle such as a passenger car. The dashboard comprises an upper or cover part which covers and is fastened at least partially to the housing upper part of a heating and/or air conditioning system housing.

In prior art dashboards, upper parts can be attached to components and front cross members only while windshields, which attach to the upper parts, have not yet been mounted. Once a windshield has been mounted, an upper part of a prior art dashboard can be disassembled only with considerable effort, if the windshield is not disassembled along with it. Therefore, any repairs to this upper part and components covered by the upper part require considerable assembly work.

An object of the invention is to render assembly and disassembly of such an upper or cover part easier.

This object is achieved by providing cover and housing upper parts with fastening structure and recesses which are positioned toward the top corner relative to the interior of the motor vehicle and which can be fitted together in this direction.

In this way, the cover part can be mounted relatively late during vehicle manufacture, i.e., after installation of the windshield. Thus, it is easy to make a relatively late change in design during vehicle manufacture, since different cover part shape and color variations are not made until then. Subsequent disassembly and repair are readily possible by simply replacing the entire cover part. It is easy to preassemble a functional unit and then to fix the design by means of the cover part. The design can also be changed later.

The cover part of the invention is a multilayered plastic molded part, which includes a substrate comprising EPP (expanded polypropylene) foam and a sound absorbing layer. In this manner, a cover part that absorbs sound in an especially advantageous manner is created. Hence, heating and air conditioning system noises and/or noises from other components are passed on only in a very reduced form into the interior of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
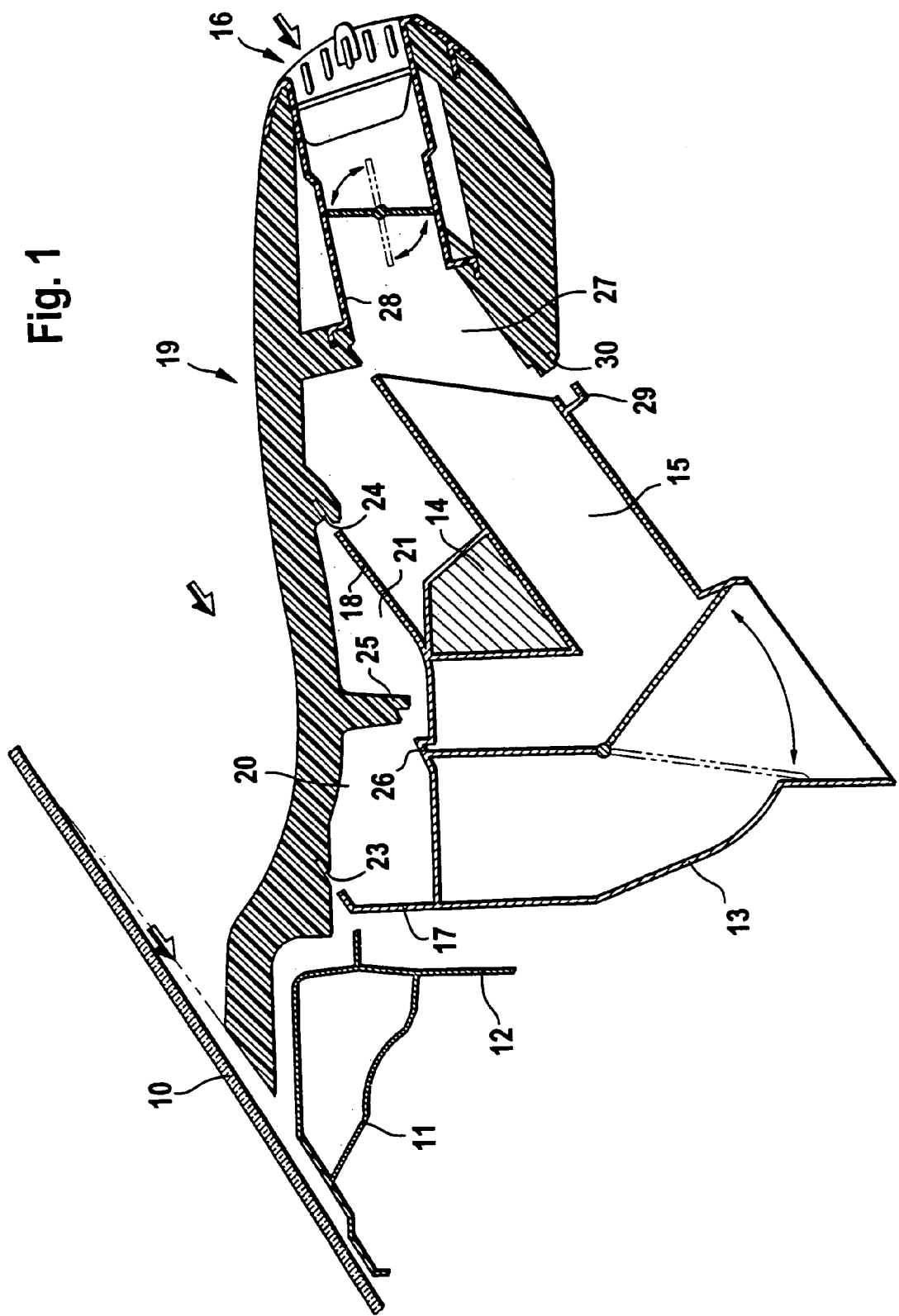
FIG. 1 is an exploded sectional view along the longitudinal center plane of a passenger car in the area of a dashboard constructed according to a preferred embodiment of the invention.

FIG. 1 depicts a section of the front area of the vehicle interior of a passenger car. This section shows a relatively acutely tilted windshield 10 mounted on a cross member 11. The cross member 11 passes over into a face wall 12 made of sheet metal, of which only a part is shown. In the center of the vehicle there is also a column-like housing of a heating and air conditioning system, of which the upper part 13 is shown. The upper part 13 is mounted on a cross member 14 of the vehicle; this cross member connects the two A columns of the vehicle frame together.

Several air channels, which are shown only partially, branch off from the housing upper part 13. These air channels include an air channel 15, which leads to the center nozzles 16. Above the housing upper part 13, there are arms 17, 18, which run in the cross direction of the vehicle and which are completed by means of an upper or cover part 19, forming the air channels 20, 21. The air channel 20 leads, for example, to the defroster outlets, which are set relative to the windshield 10. The air channel 21 leads to side nozzles, which are located in the side regions of the dashboard.

The upper part 19 is a plastic molded part with a construction which will be explained in detail below with reference to FIG. 3.

The upper part 19 is designed in such a manner that it can be mounted, starting from the top corner approximately parallel to the windshield 10, on the cross member 11 and the housing upper part 13, and can be fastened to the same. Thus, it is possible to attach the upper part 19 following installation of the windshield 10 and to disassemble the upper part again with the windshield 10 remaining installed. In its installed state, the upper part 19 is braced, with a recess adapted to the contour of the cross member 11, against the cross member 11. The upper part can also be fastened with screws or the like to this cross member. To fasten the screws largely invisibly, they can be provided in the area of the defroster opening (not illustrated), which leads from the air channel 20 to the windshield.

The arms 17, 18 and the air channel 15 as well as the other not visible parts of the housing upper part 13 are provided with fastening means or structure. The fastening means engage with corresponding counter pieces of the upper part 19 in the inclined assembly direction and can then be connected to them. In the embodiment shown, the upper part 19 is provided with slotted recesses 23, 24 for the edges of the arms 17, 18. The two air channels 20, 21 are separated from one another by a leg 25; this leg descends from the upper part 19 and is braced against a projection 26 of the arms. The edges of the air channel 15 are plugged into an air channel 27, which forms a continuation of the air channel 15 and which includes an insert 28. This insert contains the elements of a center nozzle 16. In the embodiment shown in FIG. 1, the insert 28 with the elements of the center nozzle has been inserted into the upper part. It is also contemplated by the invention to mold in this insert 28 during production of the upper part 19.

The air channel 15 has a peripheral leg 29, which runs parallel to an edge of the air channel and mates with a slot 30 of the upper part. A seal is formed with the peripheral leg due to elastic pressing. In addition, it is also possible during assembly to connect welding or vibration welding the upper part 19 inseparably to the bottom part or the housing upper part 13 by, for example, cementing, ultrasound welding, or vibration welding. It is possible, especially with vibration welding, not to form the slotted recesses 23, 24 or 30 until the edges of the housing upper part 13 penetrate into the upper part 19.

The upper part 19 is expediently secured at the housing upper part 13 by additional fastening elements such as screws screwed into parts of the housing upper part 13. These screws are inserted expediently starting from the bottom or from the openings for the nozzles, are screwed in so that they are covered, and are not visible without effort from the outside.

Figure 2:
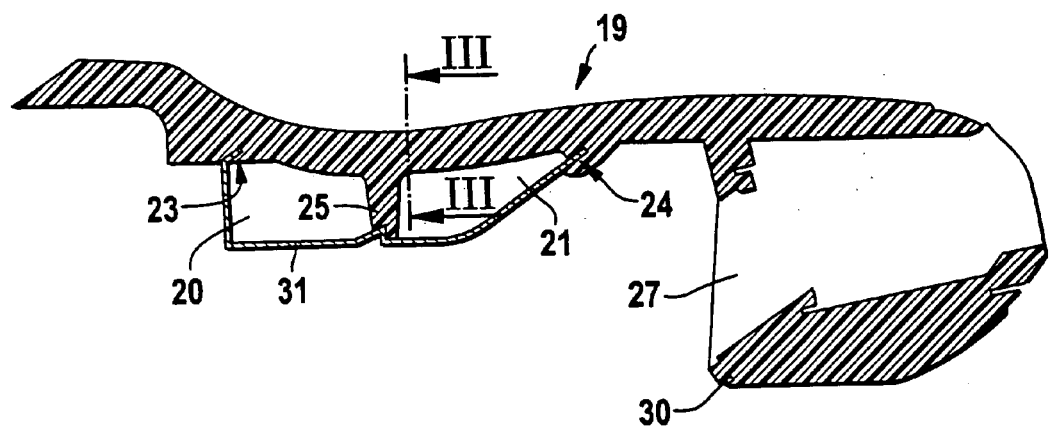
FIG. 2 is a sectional view, similar to FIG. 1, of another embodiment of an upper part of the dashboard.

As illustrated in FIG. 2, it is also possible to provide a dish-shaped component 31, independently of the housing upper part 13, which is either connected beforehand to the upper part 19 or already molded to the upper part 19. In this case, it is possible to insulate the dish-shaped part on its underside, facing away from the upper part 19, with a special foam layer.

Figure 3:
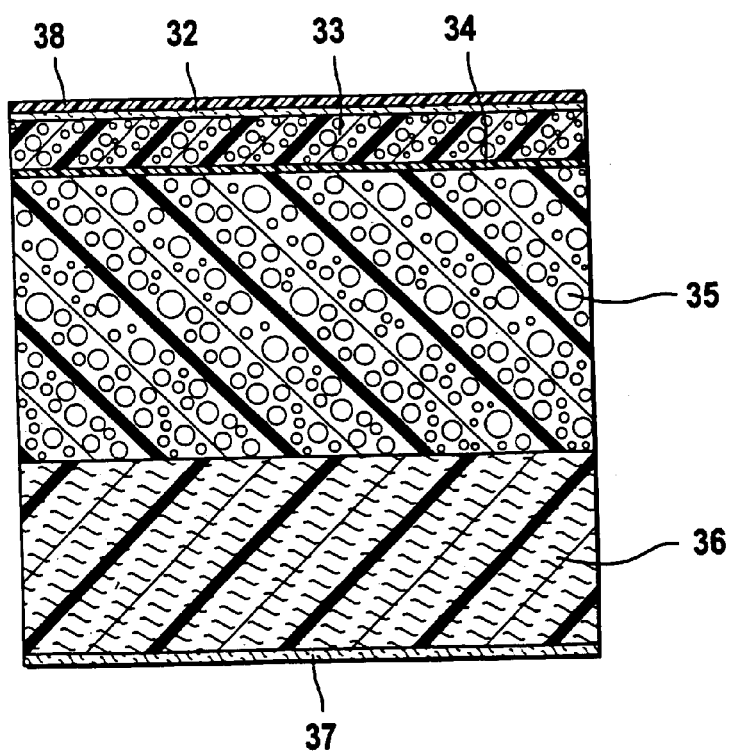
FIG. 3 is a sectional view along the line III—III of FIG. 2.

The construction of the upper part 19, which is produced as a plastic molding, is evident from FIG. 3. The outside forms a decorative film 38, which can be grained or smooth. Under the decorative film there is a thin layer 32 of a material such as polypropylene fabric, fleece or the like. Underneath that, there is then a foam back 33 with a thickness of up to 4 mm. The foam back is followed by a barrier layer 34, which is then followed by a substrate with a thickness ranging from 6 mm to 20 mm and preferably with a thickness of 10 mm. This substrate 35 is made of an EPP foam (expanded polypropylene), which exhibits a weight ranging from 40 to 160 g/l and, in particular, from 50 to 80 g/l. This substrate 35 is followed by a so-called acoustical layer 36, which is made, for example, of a sound absorbing EPP or a PP fleece and exhibits a thickness ranging from 3 mm to 10 mm. To obtain the sound damping properties, the material exhibits expediently a low density ranging, for example, from 25 to 40 G/L. The acoustical layer 36 is covered on its underside with a cover layer 37, which serves to reduce the surface roughness. The cover layer can be a woven material, a non-woven material or an EPP with skin formation. The thickness ranges from approximately 50 $\mu$m to 2,000 $\mu$m.

The upper part 19 can be produced by: placing a skin into, for example, a surface structured tool, placing insert members into the tool and fixing them in position, blowing in a material component for the substrate 35 such as EPP foam particles, blowing in a material component for the sound absorbing layer 36, vapor coating, cooling down, ejecting, trimming and, optionally, producing a bend.

In a modified production process, the procedure is reversed and, in the last step, the upper part is laminated with a decorative film 38. Thus, the following steps result:

Inserting a flat shaped textile web, introducing the acoustically effective component for the acoustical layer 36, introducing the component for the substrate 35, vapor coating, cooling down, and ejecting.

The upper part 19, produced in this way, is then laminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A passenger motor vehicle comprising:
   a vehicle windshield,
   a crossmember on which the vehicle windshield is mounted, and
   a vehicle dashboard assembly disposed behind the windshield in front of a vehicle passenger space,
   said dashboard assembly including a housing part, provided with fastening structure, and a cover part having slotted recesses therein for receiving the fastening structure when the cover part is installed in the vehicle,
   wherein the housing part is mounted to the vehicle body and the cover part is thereafter mounted on the crossmember and the housing part, braced with a recess adapted to a contour of the crossmember, against the crossmember, and detachably fixed to the housing part following installation of the windshield, so as to be removable from the housing part to provide for disassembly and repair, and replaceable on the housing part following the repair even though the windshield is installed already.

2. The passenger motor vehicle according to claim 1, wherein the housing part is an upper part of a housing of a heating and/or air conditioning system, and wherein said fastening structure includes arms which are directed toward vehicle sides and, together with the cover part, form at least one air channel when the cover part is installed in the vehicle.

3. The passenger motor vehicle according to claim 2, wherein the cover part is a multilayered plastic molded part which includes a substrate comprising EPP foam and a sound absorbing layer.

4. A method of making a passenger motor vehicle comprising:
   mounting a vehicle windshield in a final position on a crossmember of the motor vehicle thereby placing a housing part provided with fastening structure adjacent the vehicle windshield at a side of a vehicle passenger space facing the windshield, and
   subsequently mounting a cover part of a vehicle dashboard on the crossmember, bracing the cover part, with a recess adapted to a contour of the crossmember, against the crossmember, and detachably connecting the cover part of the vehicle dashboard to the fastening structure,
   wherein the cover part is provided with slotted recesses therein for receiving the fastening structure,
   wherein the fastening structure and the recesses are inclined toward the vehicle passenger space, and
   wherein detachably connecting the cover part provides for removing the cover part from the housing part even though the windshield is installed, performing a repair, and subsequently connecting either said cover part or another cover part to the fastening structure.

5. The method according to claim 4, wherein the housing part is an upper part of a housing of a heating and/or air conditioning system, and wherein said fastening structure includes arms and, together with the cover part, form at least one air channel when the cover part is installed in the vehicle.

6. The method according to claim 5, wherein the cover part is a multilayered plastic molded part which includes a substrate comprising EPP foam and a sound absorbing layer.

\* \* \* \* \*